June 16, 1942.  A. W. ABRAHAMSEN  2,286,190
SCRAPING TOOL
Filed April 13, 1939
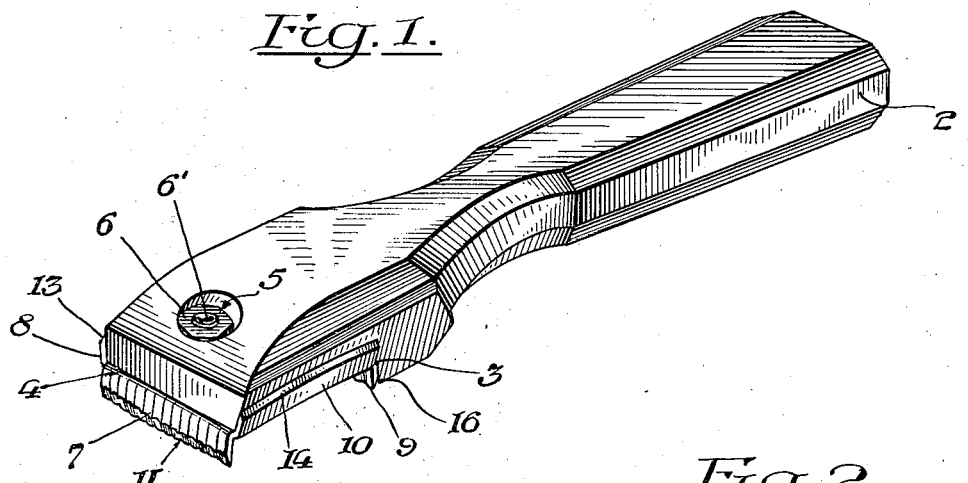
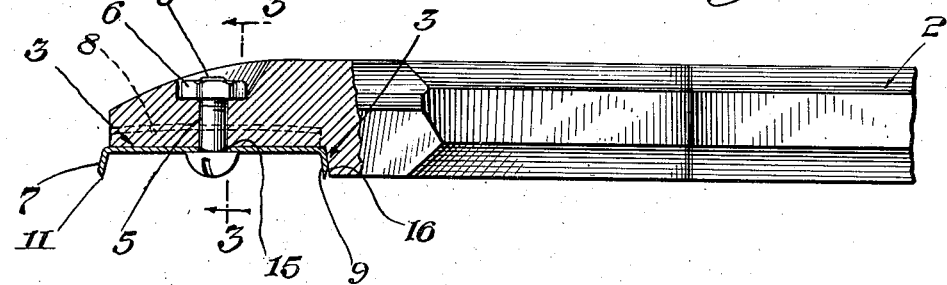
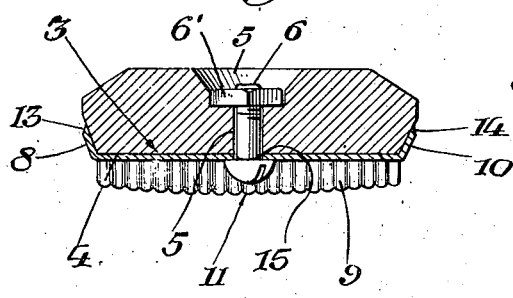
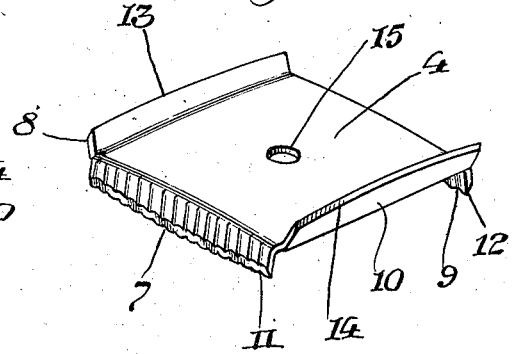
Inventor
Alfred W. Abrahamsen
by his Attorney Patented June 16, 1942

2,286,190

UNITED STATES PATENT OFFICE 2,286,190

SCRAPING TOOL

Alfred W. Abrahamsen, Hempstead, N. Y.

Application April 13, 1939, Serial No. 267,634

23 Claims. (Cl. 30—171)

The present invention relates to scraping tools particularly adapted for scraping rough surfaces where a strong durable tool is required and one capable of breaking up heavy coats of finishing material or removing barnacles from ships' bottoms, and the like, the principal object being the provision of such a tool which is simple and inexpensive to manufacture and yet is capable of producing the desired results in an expeditious manner.

A further object of the present invention is the provision of a scraper blade having serrated cutting edges and smooth edges, the serrated edges for the purpose of removing the rough and hard surfaces above referred to while the smooth edges are for making a finishing cut.

A still further object of the present invention is the provision of a cutter blade with a serrated cutting edge which may be manufactured at low cost and requires no complicated and expensive equipment therefor.

A still further object of the present invention is the provision of cutting edges formed by bending metal along the grain thereof, heretofore considered impractical when the metal is bent sharply and intended to resist strain, by reinforcing the flanges having these cutting edges by corrugating the metal at the heel or point of bending.

A still further object of the present invention is the provision of a cutter blade and handle so constructed that the cutter blade will at all times be prevented from turning while in use, even though secured to the handle by a single central fastening means and which handle will, at the same time, act as a guard for the cutting edges of the blade when not in use.

It is further an object of the invention to stamp from metal such as sheet metal, a blade comprising a body and a flange bent along the grain of the metal and simultaneously with the bending of such flange, reinforcing, as by corrugating, the flange cross-wise of the grain thereof and then grinding the flange to form a cutting edge—preferably a serrated cutting edge.

In the drawing accompanying and forming a part of this specification,

Fig. 1 is a perspective view of this improved scraper.

Fig. 2 is a side view thereof partly in section.

Fig. 3 is a sectional view taken on the line 3—3 of Fig. 2, and

Fig. 4 is a perspective view of a cutter blade detached.

Similar characters of the reference indicate corresponding parts in the several views.

Before explaining in detail the present improvement and mode of operation thereof, I desire to have it understood that the invention is not limited to the details of construction and arrangement of parts illustrated in the accompanying drawing since the invention is capable of other embodiments, and that the phraseology employed is for the purpose of description and not of limitation.

The present improvement comprises a handle 2 having at one end thereof a recessed or cutaway portion 3 for the reception of a cutter blade 4 and is provided with a hole 5 for the reception of suitable fastening means such as a screw 6 and nut 6'.

The blade 4 is formed with four flanges 7, 8, 9 and 10, one pair of opposite flanges, 7 and 9, being bent downward, for instance, and the pair of flanges, 8 and 10, upward with relation to the body portion 4. It will be noted that the bending of these flanges 7, 8, 9 and 10 is accomplished with a slight curvature with relation to the body 4.

While heretofore it has been considered impractical to bend metal along the grain thereof because it results in a weakened edge, I have found that, by corrugating the metal crosswise of the grain at the point of bending or the heel of the edge, preferably simultaneously with the bending, the metal is so strengthened that its efficiency is not impaired and by grinding the corrugated flanges 7 and 9 at an angle, I provide the serrated cutting edges 11 and 12 which are ideal for rough scraping such as involved in removing barnacles from the sides of a ship and for digging under hard coats of finishing material.

It will thus be observed that the corrugation of the metal serves two purposes, that of providing a strong durable edge bent along the grain of the metal and, when ground at an angle, produces a serrated scraping surface which, otherwise, would be very difficult and expensive to obtain.

The flanges 8 and 10 for finish scraping likewise are ground at an angle to provide the cutting edges 13 and 14 and these cutting edges, as well as the edges 7 and 9 are slightly curved from end to end, that is, higher at the center than at the ends. This slight curvature of the edges in grinding and forming prevents the corners of the tool from gouging flat work and also reduces the area on which pressure applied to the cutter is effective which, with reference to the serrated edges, makes it easier to dig under the hard coats of finishing material and is very efficient in cleaning off the sticky residue resulting from the use of varnish and paint remover.

The cutter blade 4 is provided with a hole 15 registering with the hole 5 of the handle for securing it thereto and it will be noted that by bending a pair of flanges 7 and 9 or 8 and 10 in the same direction, a channel is provided enabling the blade properly to be positioned on the handle and prevent turning of the blade in use should it become loose on the handle.

The flanges so overlap the handle that their edges are guarded thereby when the tool is in use and the shoulder 16 of the handle formed by the recessed or cut-away portion 3 is the approximate depth of any of the flanges and thus acts as a guard for the third cutting edge when the tool is in use, preventing injury to the operator.

Thus, it will be seen that I have provided an efficient, inexpensive and practical scraping tool capable of doing both heavy rough scraping work and finish scraping, the scraping edges of which are easy to sharpen and keep in working condition and which edges, when not in use are guarded so as not to injure the operator or gouge surfaces or areas not being scraped.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A tool of the class described comprising a handle having a cut-away portion and a four-sided scraper blade removably secured to said handle, and having a pair of its sides extending opposite to the other pair, said handle and blade having cooperating and overlapping means for guarding those edges of said blade not in operative position to protect the hand of the user.

2. A tool of the class described comprising a handle having a cut-away portion and a four-sided scraper blade removably secured to said handle, and having a pair of its sides extending opposite to the other pair, said handle and blade having cooperating and overlapping means for guarding those edges of blade not in operative position to protect the hand of the user, said cooperating means adapted also to prevent shifting of said blade when in use.

3. A tool of the class described comprising a handle having a blade receiving face terminating at its rear in a shoulder, and a scraper blade removably secured thereto and having angularly formed flanges having two pairs of cutting edges, the flanges of each pair located in parallelism and with a pair thereof extending opposite to the other pair whereby in use two of the flanges will overlap sides of the blade receiving face of the handle and another flange engage the shoulder whereby the hand of the user is protected therefrom.

4. A tool of the class described comprising a handle having a blade receiving face terminating at its rear in a shoulder, and a scraper blade removably secured thereto and having angularly formed flanges having two pairs of cutting edges, the flanges of each pair located in parallelism and with a pair thereof extending opposite to the other pair whereby in use two of the flanges will overlap sides of the blade receiving face of the handle and another flange engage the shoulder whereby the hand of the user is protected therefrom, a pair of said cutting edges having a serrated formation.

5. A tool of the class described comprising a handle having a blade receiving face terminating at its rear in a shoulder, and a scraper blade removably secured thereto and having angularly formed flanges having two pairs of cutting edges, the flanges of each pair located in parallelism and with a pair thereof extending opposite to the other pair whereby in use two of the flanges will overlap sides of the blade receiving face of the handle and another flange engage the shoulder whereby the hand of the user is protected therefrom, a pair of said cutting edges having a serrated formation merging into a corrugated formation.

6. A tool of the class described comprising a handle having a blade receiving face and a scraper blade removably secured thereto and having pairs of flanges each terminating in a cutting edge with one pair extending opposite to another pair whereby the blade when in use will overlap the side of the blade receiving face of the handle so that the hand of the operator is protected.

7. A tool of the class described comprising a handle having a blade receiving face and a scraper blade removably secured thereto and having pairs of flanges each terminating in a cutting edge with one pair extending opposite to another pair whereby the blade when in use will overlap the side of the blade receiving face of the handle so that the hand of the operator is protected, the cutting edge of one of said flanges having a serrated formation.

8. A tool of the class described comprising a handle having a blade receiving face and a scraper blade removably secured thereto and having pairs of flanges each terminating in a cutting edge with one pair extending opposite to another pair whereby the blade when in use will overlap the side of the blade receiving face of the handle so that the hand of the operator is protected, the cutting edge of one of said flanges having a corrugated and serrated formation.

9. A tool of the class described comprising a handle having a blade receiving face, and a blade secured thereto and comprising a body having a corrugated flange bent at an angle thereto, said flange having a serrated cutting edge.

10. A tool of the class described comprising a handle having a blade receiving face, and a blade secured thereto and comprising a body having a corrugated flange bent at an angle thereto along the grain of the body, said flange having a serrated cutting edge.

11. A tool of the class described comprising a handle having a blade receiving face, and a blade secured thereto and comprising a body having a corrugated flange bent at an angle thereto along the grain of the body, said corrugations extending crosswise of the grain and providing a serrated cutting edge.

12. A tool of the class described comprising a handle having a blade receiving face, and a blade secured thereto and comprising a body having a corrugated flange bent at an angle thereto along the grain of the body, said flange having a serrated cutting edge, the corrugations of said flange extending crosswise of the grain and from the heel of said flange to the cutting edge.

13. A tool of the class described comprising a handle having a blade receiving face, and a blade secured thereto and having a plurality of flanges bent at an angle to said body, one of said flanges having corrugations extending the depth thereof and provided with a serrated cutting edge.

14. A tool of the class described comprising a handle having a blade receiving face, and a blade secured thereto and comprising a body having two pairs of flanges bent at an angle to said body and provided with cutting edges, one pair thereof extending in a direction opposite to the other pair relative to the body.

15. A tool of the class described comprising a handle having a blade receiving face, and a blade secured thereto and comprising a body having two pairs of flanges bent at an angle to said body and provided with cutting edges, one pair thereof extending in a direction opposite to the other pair relative to the body and certain of said flanges having corrugations.

16. A tool of the class described comprising a handle having a blade receiving face, and a blade secured thereto and comprising a body having two pairs of flanges bent at an angle to said body and provided with cutting edges, one pair thereof extending in a direction opposite to the other pair relative to the body, the flanges extending in one direction having corrugations and serrated cutting edges and bent along the grain of the body.

17. A tool of the class described comprising a handle having a blade receiving face, and a blade secured thereto and comprising a body having two pairs of flanges bent at an angle to said body, one pair extending in a direction opposite to the other pair relative to the body and having a curvature from end to end, said flanges having cutting edges ground at an angle thereto.

18. A tool of the class described comprising a handle having a blade receiving face, and a blade secured thereto and comprising a body having two pairs of flanges bent at an angle to said body, one pair extending in a direction opposite to the other pair relative to the body and having a curvature from end to end, said flanges having cutting edges ground at an angle thereto, each of said cutting edges having a curvature from end to end.

19. A scraper tool comprising a stamped sheet metal blade having a body and a plurality of pairs of flanges bent at an angle thereto each pair extending in a direction opposite to the other pair, some of said flanges having reinforcing corrugations formed during the bending thereof and ground to form a cutting edge.

20. The scraper tool of claim 19 in which the corrugations extend cross-wise of the grain of the metal of the flange.

21. A scraper tool comprising a stamped sheet metal blade having a body and a flange bent at an angle thereto, said flange having reinforcing corrugations formed during the bending thereof and having a serrated cutting edge.

22. A scraper tool comprising a stamped sheet metal blade having a body and a reinforced corrugated flange bent at an angle thereto and having a ground serrated cutting edge.

23. The scraper tool of claim 22 in which the flange is bent along the grain of the metal.

ALFRED W. ABRAHAMSEN.